United States Patent
Kawatani et al.

(10) Patent No.: US 9,672,589 B2
(45) Date of Patent: Jun. 6, 2017

(54) TERMINAL DEVICE AND DRAWING DISPLAY PROGRAM FOR TERMINAL DEVICE

(75) Inventors: Satoshi Kawatani, Chiba (JP); Eiji Furuyama, Funabashi (JP)

(73) Assignee: OKI Data Infotech Corporation, Chiba-shi, Chiba (JP)

( * ) Notice: Subject to any disclaimer, the term of this patent is extended or adjusted under 35 U.S.C. 154(b) by 219 days.

(21) Appl. No.: 14/347,701

(22) PCT Filed: Mar. 27, 2012

(86) PCT No.: PCT/JP2012/057900
§ 371 (c)(1),
(2), (4) Date: Mar. 27, 2014

(87) PCT Pub. No.: WO2013/046759
PCT Pub. Date: Apr. 4, 2013

(65) Prior Publication Data
US 2014/0218409 A1    Aug. 7, 2014

(30) Foreign Application Priority Data
Sep. 29, 2011   (JP) ................................ 2011-214717

(51) Int. Cl.
G06T 11/00       (2006.01)
G09G 5/00        (2006.01)
G06T 3/40        (2006.01)

(52) U.S. Cl.
CPC ............... *G06T 3/40* (2013.01); *G06T 11/00* (2013.01); *G06T 2210/04* (2013.01)

(58) Field of Classification Search
CPC ............ G06K 15/02; G09G 2340/0407; G06T 3/4023; G06F 17/50

(Continued)

(56) References Cited

U.S. PATENT DOCUMENTS

2004/0122628 A1 *  6/2004  Laurie ................. G06F 17/5004
                                                        703/1
2006/0085474 A1 *  4/2006  Tsubono ........... G06F 17/30265
(Continued)

FOREIGN PATENT DOCUMENTS

JP          06105126          4/1994
JP          07282122          10/1995
(Continued)

OTHER PUBLICATIONS

International Search Report mailed May 22, 2012 issued in International Appln. No. PCT/JP2012/057900.

*Primary Examiner* — Gregory J Tryder
*Assistant Examiner* — Yi Yang
(74) *Attorney, Agent, or Firm* — Muncy, Geissler, Olds & Lowe, P.C.

(57) ABSTRACT

In order to display a digital drawing on a display screen of a terminal device at a scale reduction compliant accurately to actual dimensions, a CPU of a tablet-type terminal device displays drawing data of a digital drawing on a display screen at a predetermined scale reduction. At this time, the CPU references attribute information of the data of the digital drawing, compares it with a display density of the tablet-type terminal device, and displays a design drawing on the display screen at a selected fixed scale reduction. In this configuration, the drawing data at a scale reduction compliant accurately to actual dimensions can be displayed on the display screen of the terminal device. Since the display compliant accurately to the actual dimensions is achieved, a user can measure distances and dimensions by directly using a triangle scale on the display screen.

9 Claims, 12 Drawing Sheets

(58) Field of Classification Search
USPC .................. 345/472, 472.1, 660, 670; 703/1
See application file for complete search history.

(56) References Cited

U.S. PATENT DOCUMENTS

| | | | |
|---|---|---|---|
| 2006/0112350 A1* | 5/2006 | Kato | G06F 3/04845 715/781 |
| 2006/0217941 A1* | 9/2006 | Soteros | G06F 17/5004 703/1 |
| 2007/0118821 A1* | 5/2007 | Yee | G06T 11/206 715/864 |
| 2008/0244436 A1* | 10/2008 | Baker | G06F 17/5004 715/771 |
| 2009/0303253 A1* | 12/2009 | Flake | G06F 17/30899 345/660 |
| 2011/0023312 A1* | 2/2011 | Turner | B43L 7/00 33/494 |

FOREIGN PATENT DOCUMENTS

| | | |
|---|---|---|
| JP | 09259295 | 10/1997 |
| JP | 11203495 | 7/1999 |
| JP | 2001166763 | 6/2001 |
| JP | 2011095823 | 5/2011 |

* cited by examiner

TABLET-TYPE TERMINAL DEVICE

TERMINAL DEVICE AND DRAWING DISPLAY PROGRAM FOR TERMINAL DEVICE

TECHNICAL FIELD

The present invention relates to a terminal device and a drawing display program for a terminal device configured to display drawing data such as design drawing on a display screen of a tablet-type terminal device.

BACKGROUND ART

In the related art, in a building site or in a site of civil engineering work, a user touches up a point to be corrected or performs a measurement of dimensions by using a drawing printed on paper. However, since in the above-described sites, there are cases where a huge number of drawings are to be used or where there is no desk or space for the touch-up on the drawings with a writing material, the user is obliged to bear a great burden for carrying the drawings printed on paper/performing such work using the drawings.

Therefore, using the drawing data to be printed on paper and controlled by a drawing database or the like with a terminal device such as an ultraportable tablet-type terminal device attracts the attention.

FIG. 1 shows a tablet-type terminal device 50 in a state in which drawing data (a design drawing) is displayed on a display screen 51. By displaying the drawing data with such the tablet-type terminal device, the user is capable of viewing, confirming, touching up and correcting the drawing easily in the sides as described above. Therefore, convenience to the user is significantly improved in comparison with the case where the drawings printed on paper are used.

In the invention described in Patent Document 1, an image processing apparatus which is capable of setting a ratio between actual dimensions and a copied image as needed, and is configured to allow an image in the actual dimensions to be figured out easily by facilitating recognition of magnification relationship between the copied image and the actual dimensions is disclosed.

CITATION LIST

Patent Document

[Patent Document 1] JP-A-6-105126

SUMMARY OF THE INVENTION

Problems to be Solved by the Invention

However, there is a problem that even when a digital drawing controlled by a drawing database or the like by itself retains scale reduction data compliant to actual dimensions, when the digital drawing is displayed on the display screen (monitor) of the terminal device, the drawing may be displayed at different scale reduction different from the scale reduction compliant to the actual dimensions depending on attributes (the number of pixels, the density thereof and the like) of the display screen. For example, even when the user makes an attempt to perform measurement of dimensions directly from the drawing displayed on the display screen of the terminal device using the measuring instrument such as a triangle scale, accurate dimensions cannot be obtained. This is a disadvantageous point in comparison with the case where the drawings printed on paper are used.

Accordingly, it is a first object of, the present invention to provide a terminal device and a drawing display program for a terminal device which is capable of displaying a drawing on a display screen of the terminal device at a scale reduction compliant to actual dimensions accurately.

It is a second object of the present invention to provide a terminal device which is capable of providing scale reduction data to a digital drawing when the scale reduction data of drawing data of the digital drawing is unknown.

Means for Solving the Problems

In the invention described in claim 1, the first object is achieved by providing a terminal device configured to display drawing data of a digital drawing on a display screen including: digital drawing receiving means configured to receive the digital drawing having scale reduction data to be used when printing the drawing data at actual dimensions; display density data storing means configured to store data relating to a display density of the display screen; scale reduction data extracting means configured to extract the scale reduction data from the digital drawing received by the digital drawing receiving means; display means configured to perform a computation based on the display density data stored in the display density storing means and the scale reduction data extracted by the scale reduction data extracting means, and display the drawing data of the digital drawing on the display screen.

The invention described in claim 2 according to the invention described in claim 1, includes fixed scale reduction presenting means configured to present to a user fixed scale reductions of a plurality of stages; and selection receiving means configured to receive one fixed scale reduction selected out of the plurality of fixed scale reductions presented by the fixed scale reduction presenting means, and when the selection receiving means receives the one fixed scale reduction selected out of the fixed scale reductions, the display means displays the drawing data of the digital drawing at the selected fixed scale reduction.

The invention described in claim 3 according to the invention described in claim 1, is characterized in that if the drawing data of the digital drawing received by the digital drawing receiving means is drawing data in a raster format, the drawing data of the corresponding digital drawing includes data relating to the drawing resolutions in both the vertical and horizontal directions.

The invention described in claim 4 according to the invention described in claim 1, claim 2, or claim 3, is characterized in that when the data relating to the density of the corresponding display screen stored by the display density data storing means is a value expressed by "the number of pixels/actual dimensions of the display area of the display screen" of the corresponding display screen, and this value is stored relating to both the vertical and horizontal directions of the display screen.

The invention described in claim 5 according to the invention described claim 2, is characterized in that the plurality of fixed scale reductions presented to the user by the fixed scale reduction presenting means correspond to the scale reductions marked on a triangle scale.

In the invention described in claim 6, the first object is achieved by providing a drawing display program to be executed by a computer in a terminal device configured to display drawing data of a digital drawing on a display screen and have display density data storing means configured to store data relating to the display density of the display screen, the drawing display program including: a digital drawing receiving function configured to receive the digital drawing having scale reduction data to be used when printed at actual dimensions; a scale reduction data extracting function configured to extract the scale reduction data from the digital drawing received by the digital drawing receiving function; a display function configured to perform a computation based on the display density data stored in the display density storing means and the scale reduction data extracted by the scale reduction data extracting function, and display the drawing data of the digital drawing on the display screen.

The invention described in claim 7 according to the invention described in claim 1, achieves the second object by providing the terminal device including: provisional display means configured to display the drawing data at provisional scale reduction data on the display screen when the extracting means cannot extract the scale reduction data; fixed scale reduction setting receiving means configured to receive the setting of the fixed scale reduction from the user in a stage of the enlargement or reduction of the drawing data of the digital drawing displayed on the display screen; and scale reduction data computing means configured to compute scale reduction data to be provided for the drawing data of the corresponding digital drawing based on a requested display scale reduction when the setting of the fixed scale reduction is received by the fixed scale reduction setting receiving means, the fixed scale reduction whose setting is received, and a provisional scale reduction displayed by the provisional display means.

Advantages

According to the inventions described in claim 1, claim 4, and claim 6, since the computation is performed based on the data relating to the display density of the display screen and the scale reduction data extracted by the scale reduction data extracting means, the drawing data can be displayed at the scale reduction compliant accurately to the actual dimensions on the display screen of the terminal device.

In the invention according to claim 2, the drawing data can be displayed at the scale reduction accurately compliant to the actual dimensions according to a fixed scale reduction requested by the user.

In the invention according to claim 3, the drawing data can be displayed at the scale reduction accurately compliant to the actual dimensions even when the drawing data of the digital drawing is in the raster format.

In the invention according to claim 5, the measurement of the dimensions and distances can be performed easily on the display screen using a triangle scale.

In the invention described in claim 7, the scale reduction data can be provided for the drawing data of the digital drawing whose scale reduction data is unknown, and thereafter the digital drawing can be displayed at the scale reduction accurately compliant to the actual dimensions on the display screen of the terminal device.

MODE FOR CARRYING OUT THE INVENTION

Referring now to FIG. 1 to FIG. 12, a terminal device according to an embodiment of the present invention will be described in detail.

(1) Summary of the Embodiment

Figure 1:
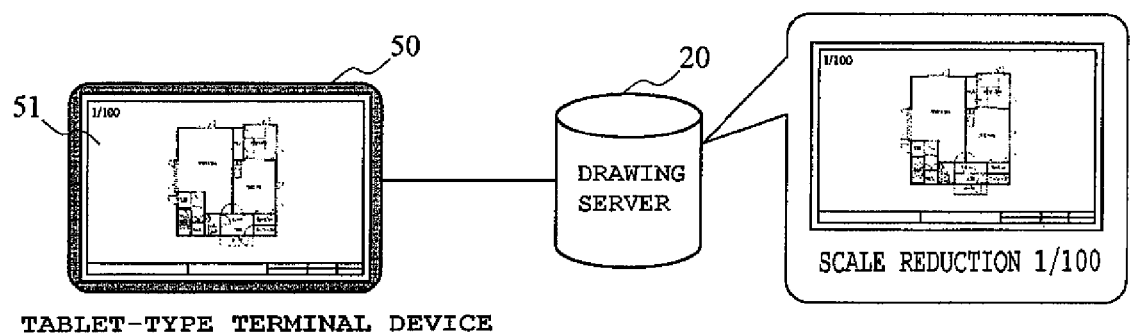
FIG. 1 is an explanatory drawing showing an outline of a system using a tablet-type terminal device according to an embodiment of the invention.

As shown in the outline of a system employing a tablet-type terminal device in FIG. 1, upon reception of a command to display a digital drawing of a design drawing at a designated scale reduction, a tablet-type terminal device 50 acquires the digital drawing of the design drawing stored in a drawing server 20 and displays drawing data such as a design drawing, a construction drawing, or a civil engineering drawing on the basis of the corresponding digital drawing at a scale reduction compliant to the actual dimensions on a display screen 51 in the same manner as the design drawing is printed on paper.

In other words, the tablet-type terminal device 50 is configured to be capable of displaying a design drawing accurately on the display screen 51 of the tablet-type terminal device 50 at a scale reduction compliant to the actual dimension based on scale-down data of the digital drawing and display density data of the display screen of the tablet-type terminal device.

Figure 3:
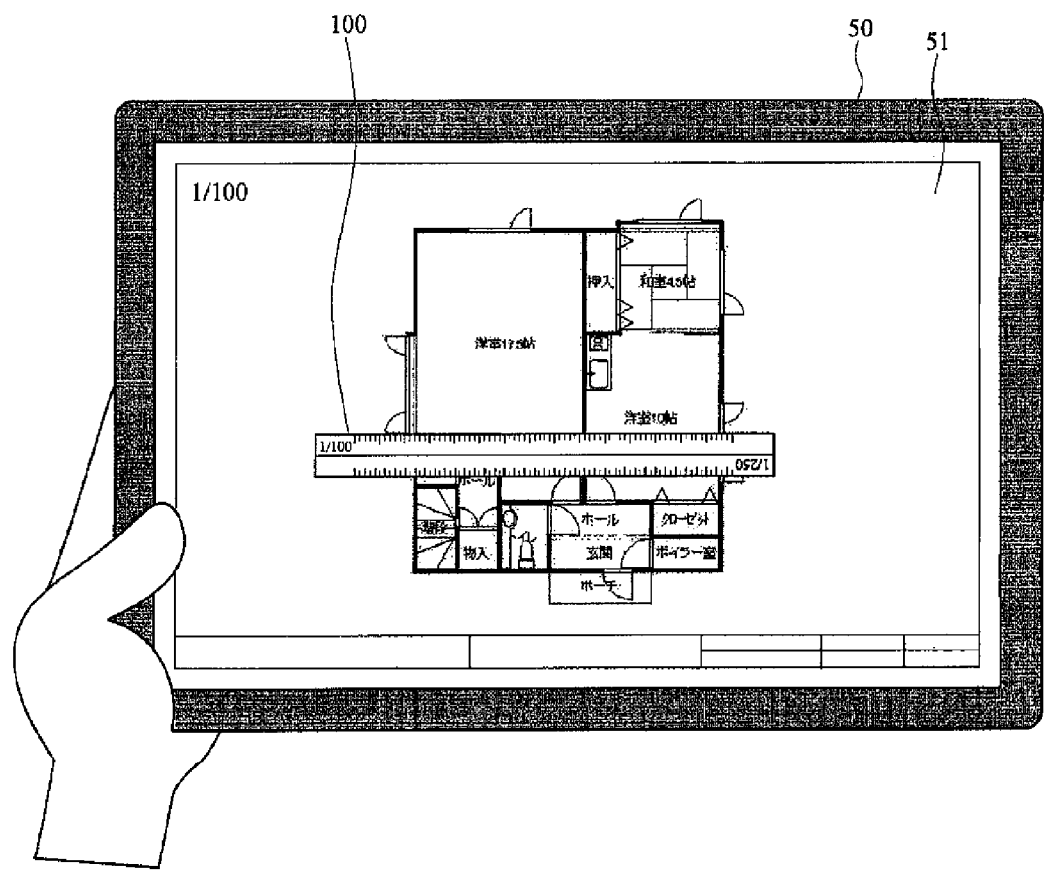
FIG. 3 is a drawing showing an example in which a design drawing displayed at a predetermined fixed scale reduction on a display screen of the tablet-type terminal device according to the embodiment is measured using the triangle scale.

Consequently, a user is capable of measuring distances and dimensions using a distance measuring tool such as a triangle scale directly on a design drawing displayed on the display screen 51 as shown in FIG. 3 without performing a specific conversion, in the same manner as on a desired drawing drawn on paper.

(2) Detail of the Embodiment

First of all, referring to FIG. 1, an outline of the system using the tablet-type terminal device according to this embodiment will be described.

In this embodiment, the digital drawing includes drawing data and associated information of the drawing data. Also, the associated information includes scale reduction data to be used when printing the drawing data in actual dimensions, and resolution of the drawing data.

The printing of the drawing data in actual dimensions means that if the printing according to the scale reduction data is performed, printing in accurate dimensions according to the scale reduction of the scale reduction data is actually achieved. If the drawing data with the scale reduction data of one fiftieth is printed in actual dimensions, the drawing is printed at a scale reduction of one fiftieth.

Although the tablet-type terminal device such as a tablet PC will be explained as the display terminal in this embodiment as an example, the invention may be applied to various types of portable terminals including a laptop personal computer or of a cellular phone provided with a function to display an image on a display screen.

The tablet-type terminal device 50 configured to display the drawing data of a digital drawing such as a design drawing is configured to be capable of sending and receiving various types of data with the drawing server 20 via a network such as internet. The tablet-type terminal device 50, being thin and relatively light weighted, is suitable for carrying along, and is specifically convenient to be brought to building sites, civil engineering work sites, or sites of measurement, for example.

When using a tablet-type terminal device of a type having no shouldered edge which is protruded on the display screen 51 and being flat over the entire surface as this tablet-type terminal device 50, for example, it is more convenient for measurement using a triangle scale 100 as described later.

Figure 2:
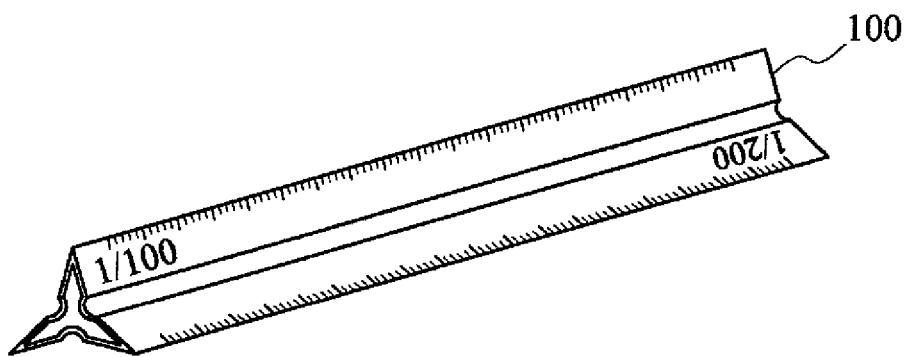
FIG. 2 is a drawing showing an appearance of a triangle scale.

Here, the triangle scale 100 as a tool for measuring the distance will be described. The triangle scale 100 is a scale configured to measure dimensions of the drawing at an actual size as shown in FIG. 2. For example, when the user measures dimensions from a drawing of a scale reduction of $1/20$, an actual measurement value is acquired by reading the value of the graduation corresponding to the scale reduction of $1/20$ marked on the triangle scale 100. Therefore, the user of the triangle scale 100 can obtain the actual measurement value easily without being bothered by any troublesome calculations such as conversion.

As an example, the triangle scale 100 shown in FIG. 2 includes the graduations corresponding to the scale reductions of $1/20$, $1/50$, $1/100$, $1/200$, $1/250$, and $1/300$ on the six surfaces respectively. There are many types of triangle scales 100 by intended uses such as those for architects, civil engineering, real estate survey, and general use, and they are differentiated in marked rates of scale reduction to some extent depending on the applications.

In this embodiment, the dimensions on the drawing are measured using the triangle scale 100 used widely in sites. However, since the tablet-type terminal device 50 displays drawings on the display screen 51 at the same scale reduction as the drawings printed on paper, the measurement may be performed using normal scales or triangle ruler as long as the correspondence relation between the dimensions of the drawings on the display screen and the actual dimensions is accurately figured out.

Figure 4:
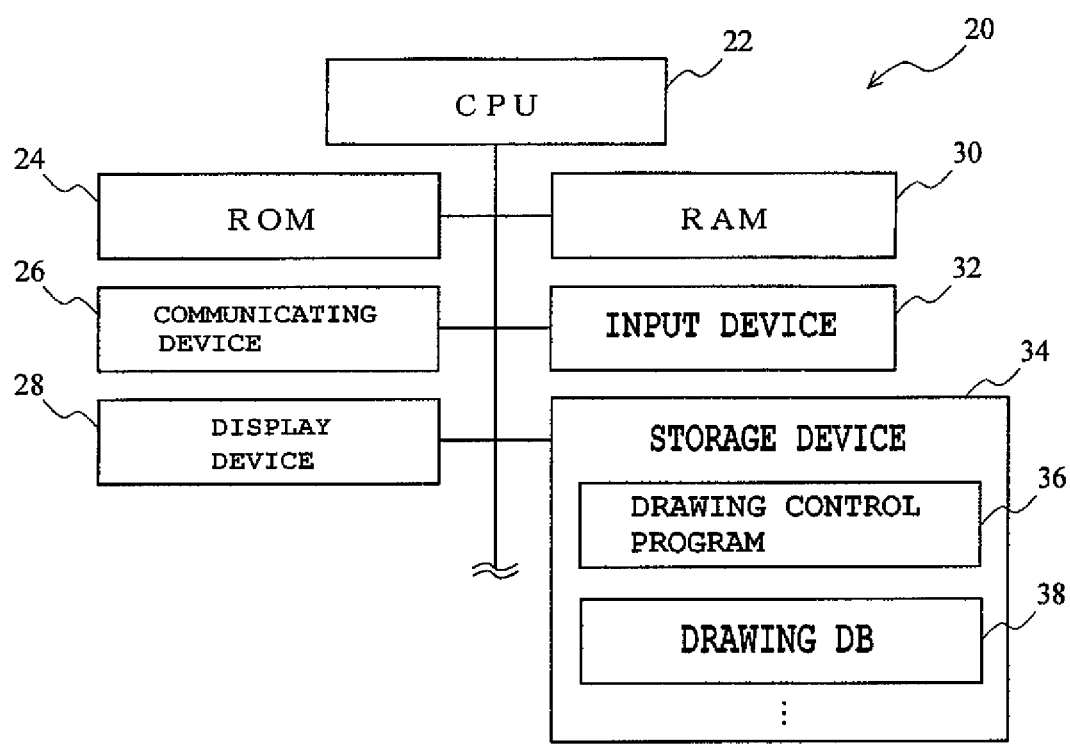
FIG. 4 is a block diagram showing a configuration of a drawing server used in the embodiment.
Figure 5:
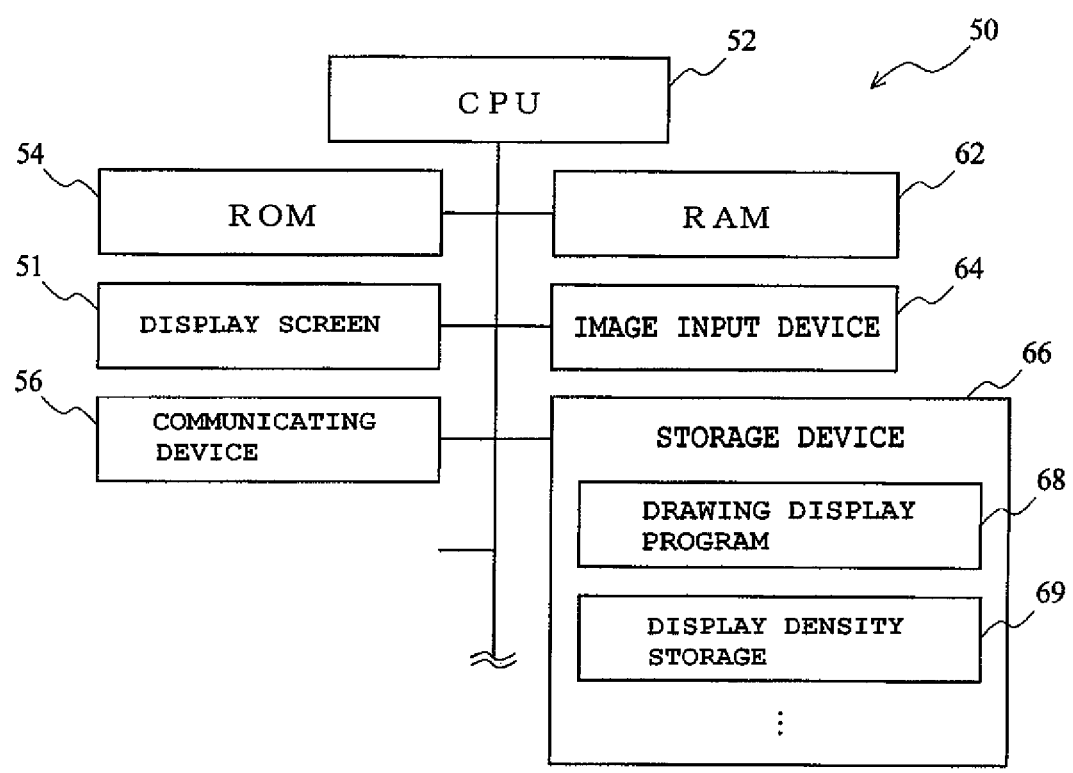
FIG. 5 is a drawing showing a configuration of the tablet-type terminal device used in the embodiment.

Referring now to FIG. 4 and FIG. 5 configurations of the drawing server 20 and the tablet-type terminal device 50 will be described.

FIG. 4 is a block diagram showing the configuration of the drawing server 20.

The drawing server 20 includes a CPU (Central Processing Unit) 22, an ROM (Read Only Memory) 24, a communicating device 26, a display device 28, an RAM (Random Access Memory) 30, an input device 32, and a storage device 34.

The CPU 22 controls respective parts of the drawing server 20 as a whole by executing information processings according to various programs.

The ROM 24 is a read only memory in which the various programs to be executed by the CPU 22 or parameters required for executing the corresponding programs are stored.

The communicating device 26 is a communication interface for connecting the drawing server 20 to a network such as internet. The drawing server 20 transmits the drawing data stored in a drawing DB 38, described later, to the tablet-type terminal device 50 via the communicating device 26.

The display device 28 is a display device such as a liquid crystal display, and is capable of displaying the stored design drawings or the like.

The RAM 30 is a readable and writable memory configured to provide a working memory which is required by the CPU 22 in performing a drawing control process or the like.

The input device 32 includes an input device such as a keyboard, and a mouse, and receives operations of the user.

For example, good efficiency and operability are not expected when searching a digital drawing in the drawing server 20 using a cellular phone as a terminal device. In such a case, the user may search a desired digital drawing by operating the display device 28 or the input device 32 of the drawing server 20 directly and send the searched digital drawing to the cellular phone.

The storage device 34 is a mass storage medium such as a hard disk, and the CPU 22 stores a drawing control program 36 configured to control the drawing data, drawing DB (database) 38 configured to hold the drawing data, and the like.

FIG. 5 is a block diagram showing a configuration of the tablet-type terminal device 50.

The tablet-type terminal device 50 includes a CPU 52, an ROM 54, a communicating device 56, a display device 58, an RAM 62, an image input device 64, and a storage device 66.

The CPU 52 controls respective parts of the tablet-type terminal device 50 at a whole by executing information processes according to various programs such as a drawing display program in this embodiment.

The ROM 54 is a read only memory in which various programs to be executed by the CPU 52 and parameters required for executing the corresponding programs are stored.

The display screen 51 is a display device such as a liquid crystal display and is configured to be capable of displaying drawing data such as design drawings at a predetermined scale reduction. Display density data of the display screen 52, which is numerical values expressed by "the number of pixels of the display screen/actual dimension of an actual display area of the display screen" of the display screen 51 is stored in a display density storage 69 described later.

The communicating device 56 is a communication interface for connecting to the network such as internet. The digital drawings are received from the drawing server 20 via the communicating device 56.

Although the communicating device 56 functions as digital drawing acquiring means, the digital drawings may be acquired in other methods. For example, acquisition via a semiconductor memory such as a USB (Universal Serial Bus) is also applicable. In addition, direct acquisition from the storage device 66 of the tablet-type terminal device 50 is also applicable. In this case, the storage device 66 stores the drawing data of the digital drawings in advance.

Also, acquisition from a PC by wired connection or radio connection to the PC in which the drawing data of the digital drawings is stored is also applicable.

The RAM 62 is a readable and writable memory configured to provide a working memory which is required by the CPU 52 in performing a drawing control process or the like.

The image input device 64 is a touch panel which detects a selection of "selection keys (button)" displayed on the display screen 51 or selection of the scale reduction menu by the user.

The storage device 66 includes a mass storage medium such as the hard disk or EEPROM (Electrically Erasable Programmable ROM), and stores a drawing display program 68 configured to display the drawing data in an enlarged or reduced scale.

The CPU 52 references attribute information included in the received digital drawing by executing the drawing display program 68, and displays the design drawing on the display screen 51 at a fixed scale reduction selected by comparing the attribute information with the display density of the display screen 51. Also, the CPU 52 displays the drawing data of the digital drawing in an enlarged or reduced scale on the display screen 51 according to the designated scale reduction.

The storage device 66 includes a display density storage 69, in which the above-described display density is stored.

The display density may be expressed by an unit of ppi, a value representing how many pixels are included in one inch, or may be expressed by an unit of dpi (the number of dots per one inch), which is referred to as the resolution of the display screen.

Subsequently, the digital drawing used in this embodiment will be described.

The digital drawing stored in the drawing DB (database) 38 of the drawing server 20 includes drawing data for displaying the drawing itself and attribute information which indicates the attribute of the drawing data.

As the attribute information, for example, the scale reduction data indicating the scale reduction when performing a printing of the digital drawing (that is, data of numerical value such as a fraction) in actual dimensions on paper, the resolution in the vertical direction and the horizontal direction (the case of a raster format drawing data) is included.

The term "resolution" here means the density of bitmap, and is expressed by an unit of dpi. The unit dpi is a value representing how many dots (bitmaps) are included in one inch, and the larger the value of dpi, the more clear the drawing (image) is expressed with fine tones.

The drawing data of the digital drawing may be configured with vector format data or raster format (bitmap format) data.

The term "vector format data" here means a system which controls all drawing (graphic) data to be processed in a computer in the form of numerical values. In this vector system, a drawing (graphic) is retained as coordinate data of respective apexes or the like and the drawing is expressed by performing a computation of information on lines which define a contour whenever it is displayed. Therefore, by changing the size or deformation of the drawing (graphic), a drawing (graphic) corresponding thereto may be displayed. Therefore, the vector system is a system suitable for the design drawing which is subject to the correction or deformation very often. Also, the vector system is a system suitable for being used in the tablet-type terminal device which executes enlargement and reduction displays very often.

In contrast, the raster format data system is a system which constitutes an image in the bitmap format.

If the digital drawing data is in the vector format and the scale reduction when printed on paper is one fiftieth, the scale reduction data is of "1/50".

In contrast, when the drawing data is in the raster format, the drawing resolutions in the vertical and horizontal directions are respectively retained as the attribute information.

There are some cases in which the display densities in the vertical direction and in the horizontal direction are different in the display screens 51 used in the tablet-type terminal devices 50. For example, there is a device which displays the drawing in the density of 150 dpi in the vertical direction and 100 dpi in the horizontal direction.

Therefore, the drawing data is needed to be displayed on the display screen 51 by performing a computation of the difference in aspect ratio using the respective densities in the vertical direction and in the horizontal direction.

In contrast, in the case of the drawing data (bitmap data) in the raster format, it is needed to retain and control both of the drawing resolution in the vertical direction and the resolution in the horizontal direction in addition to the scale reduction data as the attribute information.

In the related art, even though the drawing data of the digital drawing sent from the drawing server 20 is displayed on the display screen 51 as it is, the drawing data cannot necessarily be displayed on the scale reduction compliant to the actual dimensions. It is because the densities of the display screens are different from one device to another, and the display is created without taking such difference into consideration. Therefore, since the density of the display screen is not taken into consideration even though it is stated as being "actual-dimension display", the accurate "actual-dimension display" cannot be obtained, it is nothing more than nearly "actual-dimension display".

Therefore, in this embodiment, the drawing data of the digital drawing at the required scale reduction is generated after having replaced the drawing data of the digital drawing with a scale corresponding to the display screen considering the display density of the display screen 51. Accordingly, the drawing data of the digital drawing compliant to the scale reduction data when performing printing in the actual dimension can be displayed.

Incidentally, the term "display density" means numerical values expressed by "the number of pixels of the display screen/actual dimension of an actual display area of the display screen", and includes the numbers of pixels (number of dots) per predetermined unit respectively in the vertical direction and the horizontal direction.

Subsequently, this embodiment will be described by showing detailed numerical values.

Here, the term "nominal density" is a value showing how many pixels (dots) per inch exist in the corresponding screen, which is published by a manufacture of the corresponding display screen.

The term "requested display scale reduction" means a scale reduction requested when the user makes an attempt to display the drawing data of the digital drawing and, for example, if a requested display scale reduction of one fiftieth is issued from the user, in this embodiment, the drawing which has completely the same size both on the left and right as the drawing of a scale reduction of one fiftieth to be actually printed on paper is displayed on the display screen 51.

In the tablet-type terminal device 50 according to this embodiment, the display densities of the display screen 51 respectively in the vertical direction and in the horizontal direction are retained. In other words, these display densities are stored in the display density storage 69 of the storage device 66.

For example, in the display screen 51 of a certain tablet-type terminal device 50, when the number of pixels is 768 pixels in a display area in the vertical direction and the actual length thereof is approximately 148 mm, and the number of pixels is 1024 pixels in a display area in the horizontal direction and the actual length of the same is approximately 197 mm, and the nominal density is 132 ppi (pixel per inch), the "display density" is 132.

Here, the coordinate conversion value used in this embodiment will be described.

The term "coordinate conversion value" means a value expressed by "(scale reduction data/requested display scale reduction)×display density" (Expression 1). Hereinafter, this expression is referred to as "Expression 1". By obtaining this coordinate conversion value accurately and multiplying the coordinate value of the vector format drawing data by the obtained value, the drawing data is displayed accurately on the display screen 51 at a scale reduction compliant to the actual dimensions. The unit of the coordinate value of the drawing data in this case is inch, same as the unit of the coordinate value of the display screen.

Although a case in which the coordinate conversion values in the vertical direction and in the horizontal direction are the same is described in this embodiment, there is also a case where these values are different. In this case, the vertical coordinate conversion value and the horizontal coordinate conversion value are calculated individually.

First of all, a case where the drawing data is in the vector format will be described.

It is assumed that scale reduction data of one fiftieth is retained as the associated information of the drawing data to be displayed.

When the drawing data is displayed for the first time in the tablet-type terminal device 50, the coordinate conversion values in the vertical direction and in the horizontal direction are both the following values from "(scale reduction data/requested display scale reduction)×display density" (Expression 1).

Coordinate Conversion Value=((1/50)/(1/50))×132=132

Then, the tablet-type terminal device 50 performs a computation of multiplying the coordinate value of the drawing data in the vector data format by the calculated coordinate conversion value "132" and displays the drawing data of the digital drawing on the display screen 51.

In a case where the requested display scale reduction selected by the tablet-type terminal device 50 is one fiftieth the coordinate conversion values both in the vertical direction and in the horizontal direction will be the following value from (Expression 1).

Coordinate Conversion Value=((1/50)/(1/100))×132=66

Then, the tablet-type terminal device 50 performs a computation of multiplying the coordinate value of the drawing data in the vector data format by the calculated coordinate conversion value "66" and displays the drawing data of the digital drawing on the display screen 51.

Subsequently, a case where the drawing data is in the raster format will be described.

In this case as well, it is assumed that lateral and horizontal resolutions of 600 dpi are retained in addition to the scale reduction data of one fiftieth as the associated information of the drawing data to be displayed.

In contrast, it is assumed that the display density of the display screen 51 is 132 ppi (pixel per inch).

Here, when a selection of a requested display scale reduction of one fiftieth of the tablet-type terminal device is received from the user, if the drawing data is in the raster format, the coordinate conversion value in both the vertical and horizontal directions becomes the value obtained by dividing "(scale reduction data/requested display scale reduction)×display density" (Expression 1) by the drawing resolution, and hence is 50/50×132/600=0.22.

Then, the tablet-type terminal device 50 performs a computation of multiplying the pixel coordinate value of the raster data by 0.22 and displays the drawing data of the digital drawing on the display screen 51.

Here, when a selection of a requested display scale reduction of one hundredth of the tablet-type terminal device is received from the user, the coordinate conversion values in both the vertical and horizontal directions become 50/100×132/600=0.11 from "(scale reduction data/requested display scale reduction)×display density" (Expression 1).

Then, the tablet-type terminal device 50 performs a computation of multiplying the pixel coordinate value of the raster data by 0.11 and displays the drawing data of the digital drawing on the display screen 51.

Subsequently, detailed examples of displays on the display screen 51 in the tablet-type terminal device 50 according to this embodiment will be described.

Figure 6:
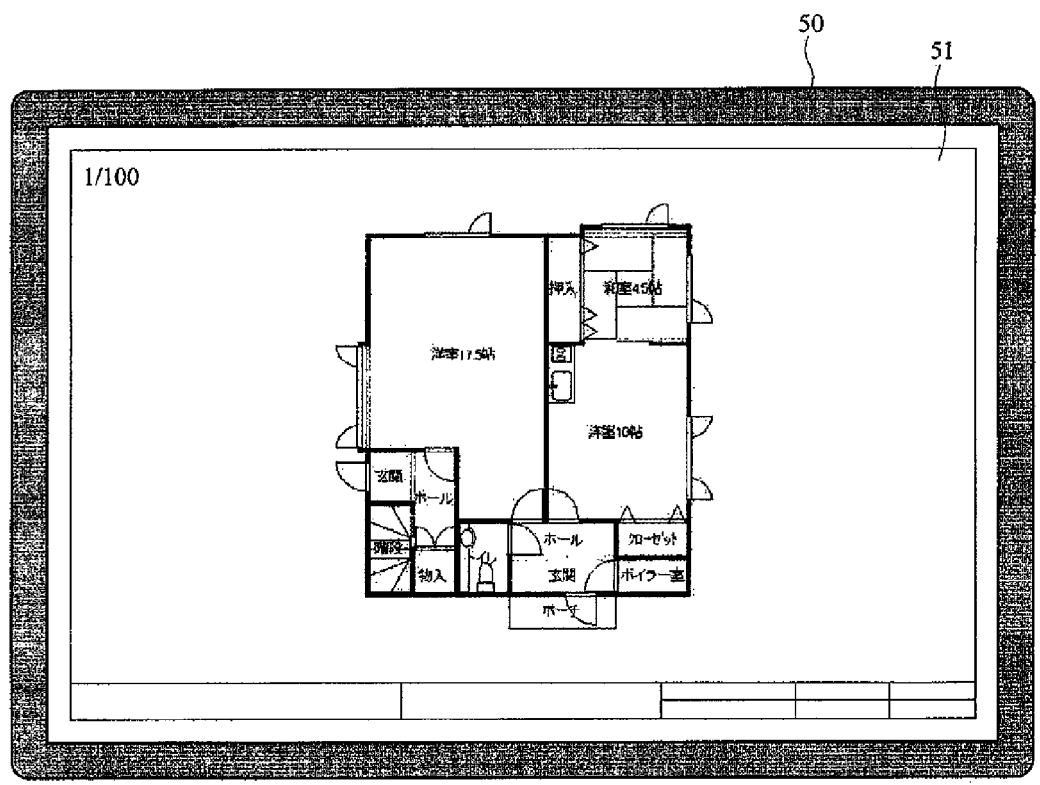
FIG. 6 is a drawing showing an example in which drawing data is displayed at a predetermined fixed scale reduction on the display screen of the tablet-type terminal device according to the embodiment.

FIG. 6 is a drawing showing a state in which the drawing data (design drawing) of the digital drawing received from the drawing server 20 is displayed on the display screen 51. In this example, since one hundredth is retained as the scale reduction data, scale reduction data of the drawing data, that is, 1/100 is used as a default value of the requested display scale reduction when displaying the drawing data for the first time.

In order to apparently indicate the scale reduction being displayed, a display of the scale reduction "1/100" is shown on an upper left of the display screen 51. The scale reduction display may be hidden by the selection by the user.

In this example, the first display is assumed to be the display corresponding to the scale reduction data, which is associated information of the received digital drawing, this embodiment is not limited thereto. For example, the drawings may be set to be displayed at a same fixed scale reduction, or may be displayed at a scale reduction received from the user in advance in each case.

The drawing data (design drawing) displayed on the display screen 51 has completely the same dimensions as the drawing data printed in the actual dimension. Therefore, the actual dimensions and distances may be measured by placing the triangle scale 100 directly on the display screen 51 and reading the graduation of "1/100" corresponding to the displayed scale reduction.

Subsequently, referring to FIG. 7, a procedure of changing the scale reduction of the drawing data to be displayed will be described.

In the tablet-type terminal device 50 according to this embodiment, a request of an actual-dimension display may be issued at a fixed scale reduction used generally on the paper drawing. In an example shown in FIG. 6, the drawing data is displayed at "1/100" as indicated on the scale reduction display on the upper left of the display screen 51. A case where the drawing is doubled in size and is displayed at "1/50" will be described.

Figure 7:
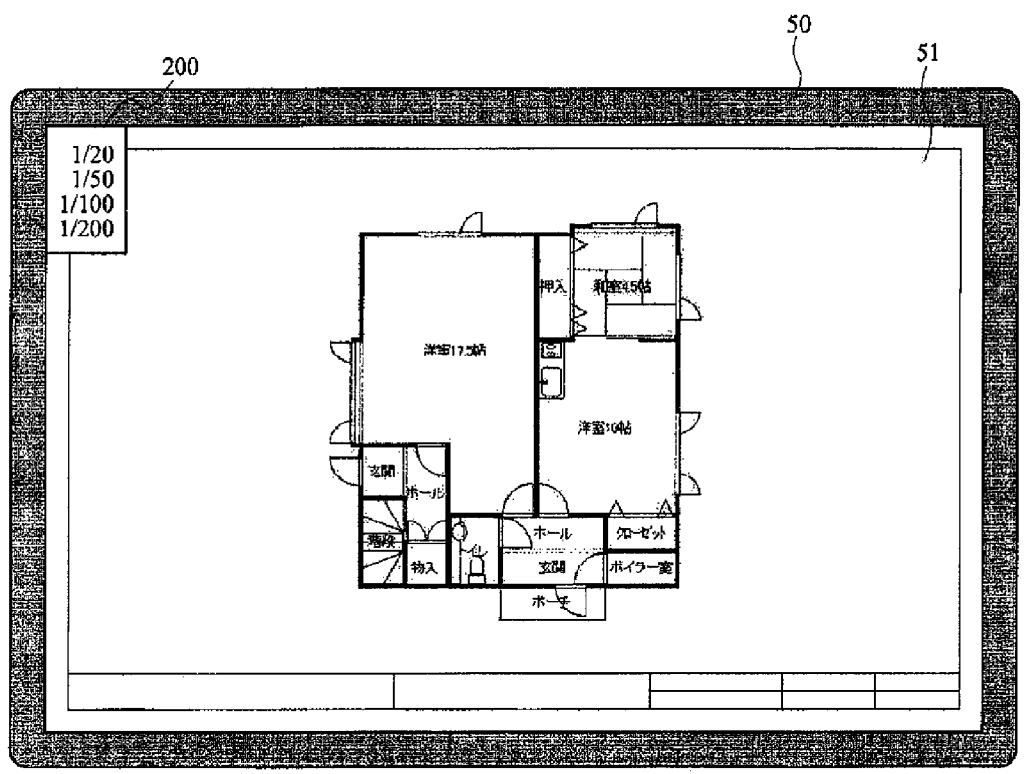
FIG. 7 is a drawing showing an example in which the drawing data is displayed at a predetermined fixed scale reduction on the display screen of the tablet-type terminal device according to the embodiment.

When the user selects the scale reduction display "1/100" (see FIG. 56) displayed on the upper left of the display screen 51, the tablet-type terminal device 50 displays a fixed scale reduction menu 200 indicating a plurality of fixed scale reductions in a pull-down menu form as shown in FIG. 7.

In this manner, by the display of the fixed scale reduction menu 200 on the tablet-type terminal device 50, the user is allowed to easily select a desired scale reduction to be displayed next.

The fixed scale reduction menu 200 includes, for example, 1/20, 1/50, 1/100, 1/200, and the like corresponding to the numerical values which are generally used in the measurement with the triangle scale.

As described above, there are several types of triangle scales 100, and the respective types support the scale reductions different to some extent. Therefore, by configuring the scale reductions to be presented by the fixed scale reduction menu 200 to cover all these scale reductions, the measurement may be performed by any types of the triangle scales 100.

It is assumed here that a selection of a scale reduction of "1/50" in the fixed scale reduction menu 200 is received from the user. This value corresponds to the "requested display scale reduction".

The tablet-type terminal device 50 calculates the coordinate conversion value from the selected requested display scale reduction, the attribute information (scale reduction data "1/100") of the digital drawing, and the display density of the display screen 51, and displays the drawing data in the actual dimensions on the display screen 51.

More specifically, in the example of the tablet-type terminal device 50 described above, when displaying the vector format drawing data, the coordinate conversion values in the vertical and horizontal directions are both $((1/100)/(1/50)) \times 132 = 264$ from the "(scale reduction data/requested display scale reduction)×display density" of Expression 1.

Then, the tablet-type terminal device 50 performs a computation of multiplying the respective coordinate values of the drawing data in the vector format by the coordinate conversion value 264 and displays the drawing data of the digital drawing on the display screen 51.

Figure 8:
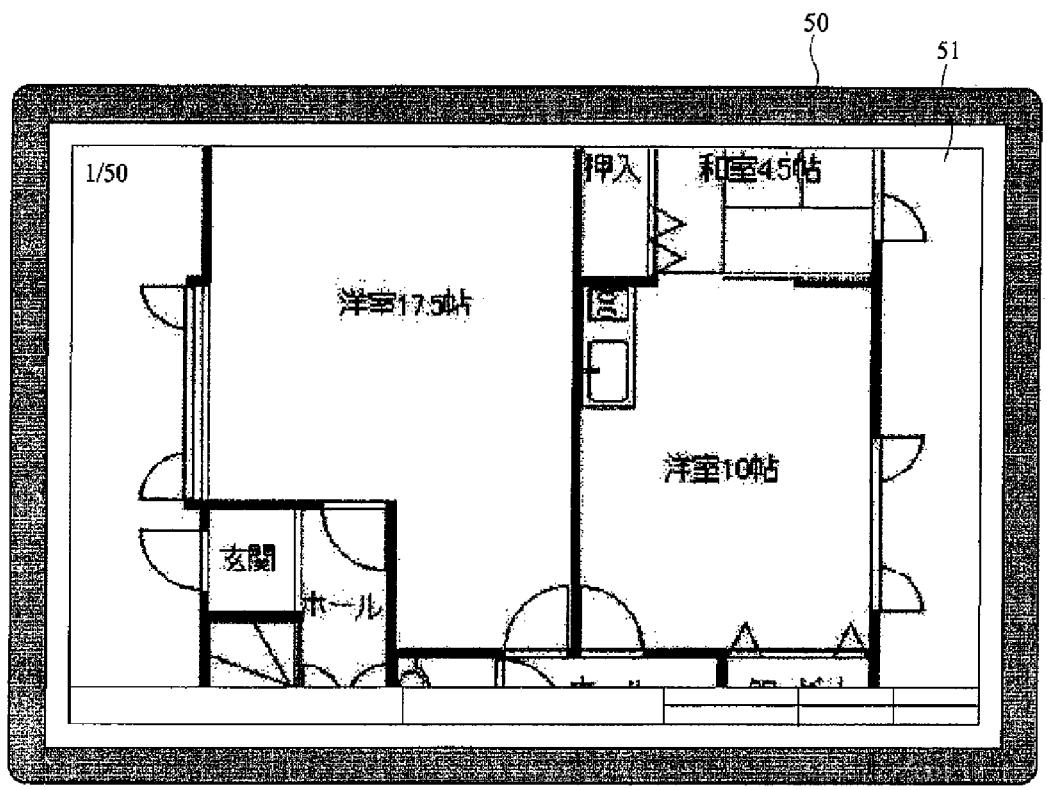
FIG. 8 is a drawing showing an example in which the drawing data is displayed at a selected fixed scale reduction on the display screen of the tablet-type terminal device according to the embodiment.

FIG. 8 is a drawing showing an example in which the drawing data is displayed at the scale reduction "1/50" according to the selection of the user.

As shown in FIG. 8, the drawing data is displayed in double size in the vertical direction and in the horizontal direction in comparison with FIG. 5 before the selection.

In this case, on the upper left of the display screen 51, the fixed scale reduction ("1/50") currently selected by the user is distinctively displayed as the scale reduction display as shown in FIG. 8.

The user is allowed to easily read the actual dimensions without conversion only by placing the graduation corresponding to the graduation value "1/50" of the triangle scale 100 directly on the display screen 51 of the design drawing so as to match the scale reduction display displayed on the display screen 51.

When the scale reduction of the drawing of the related art, printed on paper is 1/100, the user can perform measurement only by using the graduation of 1/100 of the triangle scale 100. In contrast, in the case of this embodiment, a doubled display is achieved by selecting the fixed scale reduction of 1/50 on the screen, for example, and a further accurate measurement is achieved by using the graduation of the triangle scale of 1/50.

Figure 9:
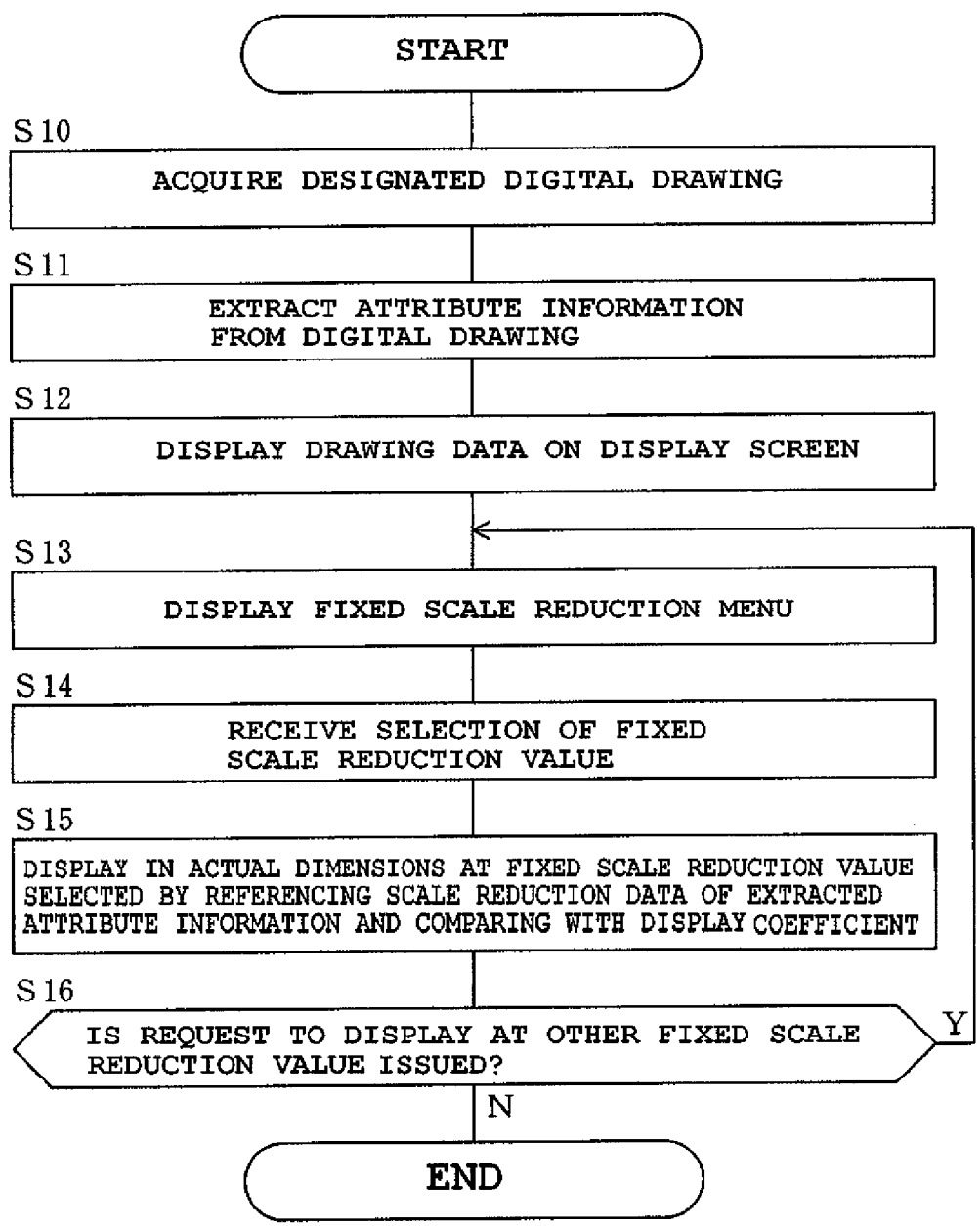
FIG. 9 is a flowchart showing processing procedure of the embodiment.

Subsequently, a procedure of the display process of the digital drawing at the fixed scale reduction by the tablet-type terminal device 50 will be described with reference to a flowchart in FIG. 9.

The display process by this fixed scale reduction is performed by the CPU 52 by executing the drawing display program 68.

Upon reception of a request which designates a design drawing to be displayed on the tablet-type terminal device 50 from the user, the CPU 52 accesses the drawing server 20 via a network. At this time, user designation information designated (user ID or password) is sent to the drawing server 20 as needed.

Subsequently, when the user selects or inputs a drawing number or the like of a digital drawing desired by the user, the CPU 52 sends the drawing number or the like to the drawing server 20 and requests the digital drawing.

When the digital drawing corresponding to the drawing number or the like designated by the drawing server 20 is sent in response to the request, the CPU 52 receives the digital drawing via the communicating device 56 (Step 10). Hereinafter, a case where the drawing data of the digital drawing is in the vector format will be described as an example.

Subsequently, the CPU 52 extracts the attribute information from the digital drawing received in Step 10 (Step 11). More specifically, since the drawing data is in the vector format, the scale reduction data is extracted. When the drawing data is in the raster format, the resolution is also extracted.

Subsequently, the CPU 52 acquires the display density of the display screen 51 stored in the display density storage 69, and displays the drawing data on the display screen 51 using the display density and the scale reduction data acquired as the attribute information (Step 12).

In other words, the CPU 52 uses the scale reduction data of the drawing data as a default requested display scale reduction when performing a computation of the coordinate conversion value on the basis of Expression 1. Then, the CPU 52 displays the drawing data (the design drawing) on the display screen 51, as shown in FIG. 6, by multiplying the respective coordinate values of the drawing data by the coordinate conversion value obtained by the computation. At this time, simultaneously, the display of the scale reduction display "1/100" is made on the upper left of the display screen 51.

Subsequently, upon reception of a command of displaying the fixed scale reduction menu 200 for changing the scale reduction from the user, the CPU 52 displays the fixed scale reduction menu 200 in which a plurality of the fixed scale reductions are marked on the upper left of the display screen 51 as shown in FIG. 7 (Step 13).

Subsequently, the CPU 52 receives a selection of a specific fixed scale reduction out of the fixed scale reduction menu 200 displayed on the display screen 51 from the user (Step 14).

Subsequently, upon reception of the selection of the fixed scale reduction in Step 14, the CPU 52 performs a computation in the same manner as the computation performed in Step 12 using the received fixed scale reduction as the requested display scale reduction. In other words, since there is no change in scale reduction data and display density, the CPU 52 computes a coordinate conversion value on the basis of Expression 1 using the selected fixed scale reduction "1/50" as the "requested display scale reduction", and displays the drawing data on the display screen 51 using the obtained coordinate conversion value as shown in FIG. 8. (Step 15).

At this time, the CPU 52 displays the selected fixed scale reduction value "1/50" as the scale reduction display on the upper left of the display screen 51 together with the drawing data (the design drawing) as shown in FIG. 8.

Consequently, the user is capable of reading the dimensions by switching the scale of the triangle scale 100 with reference to the value of the fixed scale reduction with respect to the design drawing displayed on the display screen 51 and holding the triangle scale 100 on the display screen 51.

Subsequently, the CPU 52 determines whether or not there is a command of display at another fixed scale reduction value (the selection of the fixed scale reduction) from the user (Step 16) and, if it is determined to be yes (Step 16; Y), the process from Step 13 onward is continued.

On the other hand, when the CPU 52 determines that there is no command of display at another fixed scale reduction value from the user (Step 16; N), the process relating to this flowchart is ended.

Now, an adjust mode to be used when the scale reduction of the drawing is unknown will be described as a modification of the present invention.

The above-described embodiment has been described on the conditions that the digital drawing holds the drawing data together with the scale reduction data as an attribute thereof. However, there may be cases where the digital drawing does not hold the scale reduction data or the scale reduction information is not correct.

In this modification, the tablet-type terminal device 50 is configured to provide the scale reduction as the attribute information to the corresponding digital drawing to enable accurate display of the drawing data at a scale reduction compliant to the actual dimensions.

Here, a case where the scale reduction data is not held as the attribute information of the digital drawing is assumed. More specifically, a case is assumed where the CPU 52 executes the drawing display program 68 and fails to extract the scale reduction data as the attribute information from the received digital data.

Incidentally, on many of the drawings, some actual dimension values are written normally.

Figure 10:
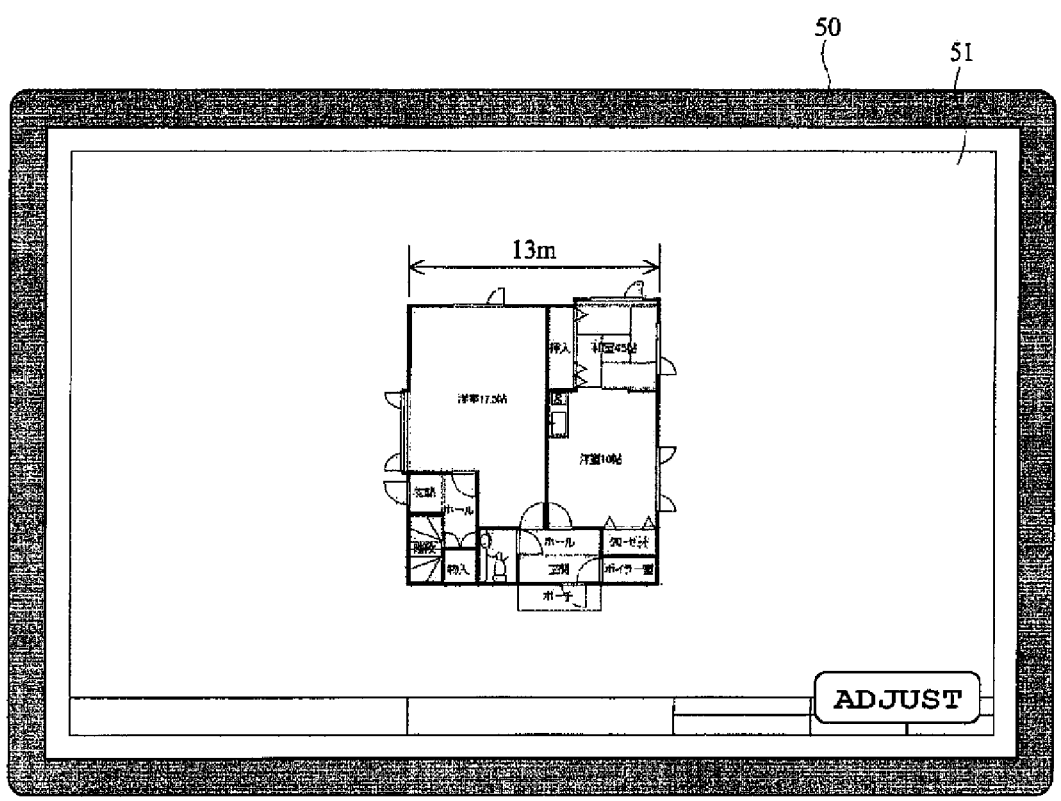
FIG. 10 is an explanatory drawing showing an "adjust mode" according to the embodiment.

FIG. 10 is a drawing showing an example in which the drawing data on which dimensions are written is displayed on the display screen 51. In this example, it is assumed that a dimension display of 13 m is written on one part.

Here, if the scale reduction data cannot be extracted as the associated information by the CPU 52, an "adjust" button is displayed at the lower right of the display screen 51.

Here, since the scale reduction of the drawing data shown in FIG. 10 is unknown, a provisional scale reduction value (provisional scale reduction) of 1/200 is set as a provisional value for displaying the drawing data, and a provisional coordinate conversion value is calculated from the above-described Expression 1 as a provisional value of the default value of the requested display scale reduction (a requested provisional default-display scale reduction) while setting the same scale reduction 1/200 as the provisional scale reduction. Here, the display count in Expression 1 is expressed by $\alpha$.

In other words, the provisional coordinate conversion value is equal to $((1/200)/(1/200))\times\alpha$.

Then, upon reception of the fact that the user has pressed the "adjust button", the CPU 52 changes the mode to the adjust mode in which the scale reduction data is provided as the associated information.

Figure 11:
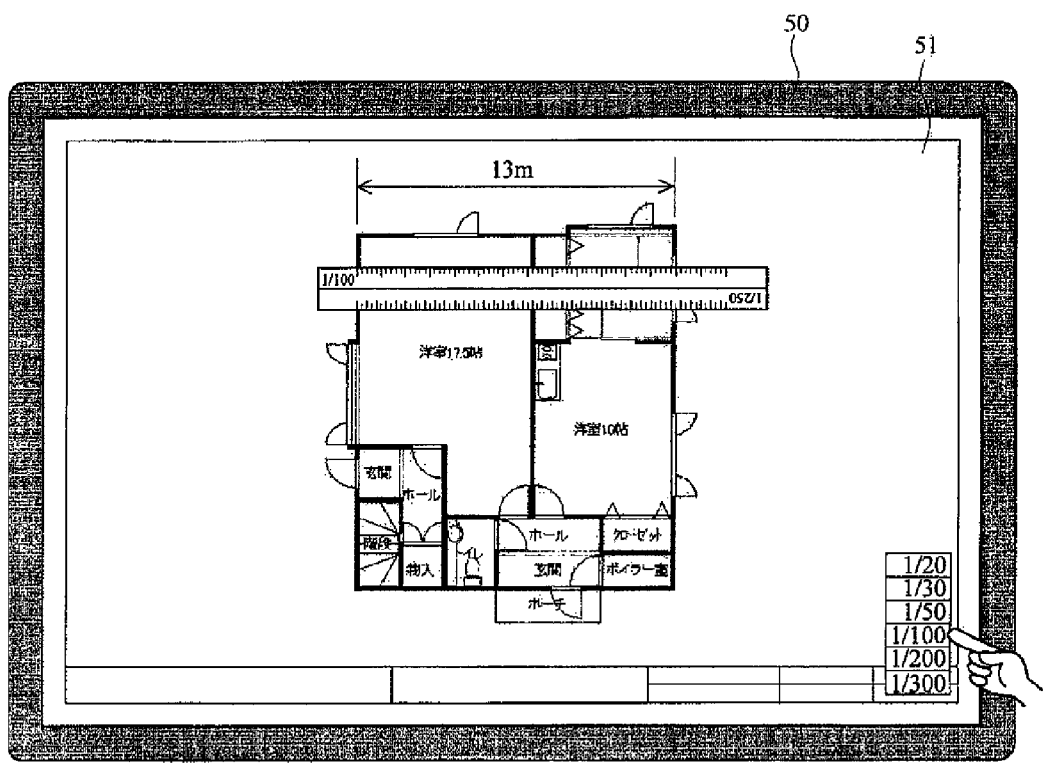
FIG. 11 is a drawing showing a state of setting the scale reduction data in the "adjust mode" according to the embodiment.

FIG. 11 is a drawing showing an example of the display screen 51 changed to the adjust mode. When changed to the adjust mode, the CPU 52 displays a scale reduction selection list at the lower right of the display screen 51.

The objects of list display are in one-to-one correspondence with the scale reduction of the graduation marked on the triangle scale.

In this state, a command of enlargement or reduction of the drawing data displayed on the display screen 51 is received from the user. The enlargement or reduction of the drawing data may be performed finely by receiving the operation from the user's finger from the image input device 64 configured as the touch panel. Alternatively, it may be performed by changing to the predetermined value step by step.

The CPU 52 stores the scale reduction after having displayed in an enlarged or reduced scale on the display screen 51 as the requested provisional display scale reduction from the requested provisional default-display scale reduction (1/200). When a command of "double" from the original size is issued by the enlargement or reduction operation by the user here, a value 1/100, which is twice the requested provisional default-display scale reduction (1/200) is stored as the requested provisional display scale reduction.

For reference sake, the CPU 52 displays the drawing data by doubling also the provisional coordinate conversion value corresponding to the command value (double) of the enlargement and reduction display.

The user performs the enlargement and contraction while finely adjusting the drawing data displayed on the display screen 51 by placing the triangle scale on the display screen 51 and operating the same with his or her finger. Then, the size of the drawing data in which the graduation of the triangle scale and the dimension written on the drawing data match is searched.

In an example in FIG. 11, a scale reduction 1/100, which is double the requested provisional default-display scale reduction of 1/200 displayed at the beginning, is the requested provisional display scale reduction and, at this time, the dimension written as 13 m on the display screen 51 (marked dimension) just matches 13 m of the graduation of the triangle scale (1/100).

In this state, the user presses the selected-scale scale reduction (1/100) which corresponds to the measured scale reduction (1/100) from among the selected-scale scale reductions displayed in the list.

The CPU calculates the scale reduction data of the drawing data from the ratio between the pressed selected-scale scale reduction and the requested provisional display scale reduction after having operated the enlargement or reduction by Expression 2.

scale reduction data=provisional scale reduction×
(selected scale reduction/requested provisional
display scale reduction) (Expression 2)

When the value in the example described above is assigned to Expression 2, the following value is obtained as the scale reduction data.

scale reduction data=provisional scale reduction
(1/200)×(selected scale reduction(1/100)/requested
provisional display scale reduction(1/100))=1/200

Therefore, in this example, the value of "1/200" is obtained as the scale reduction data to be provided.

The scale reduction data when the user selects the selected scale reduction 1/50 will be the following value.

scale reduction data=provisional scale reduction
($\frac{1}{200}$)×(selected scale reduction($\frac{1}{50}$)/requested
provisional display scale reduction($\frac{1}{100}$))=$\frac{1}{100}$ When this setting is achieved, the CPU 52 provides this scale reduction data as the attribute information of the corresponding digital drawing thereafter. Since the scale reduction data is held as the attribute information as this digital drawing, the corresponding digital drawing may be displayed at other scale reductions in this tablet-type terminal device 50.

Subsequently, the tablet-type terminal device 50 sends the attribute information provided with the scale reduction data to the drawing server 20, and uses this as the attribute information of the corresponding digital drawing.

The sending of the attribute information to the drawing server 20 is achieved by making a display to prompt a transmission after having provided the scale reduction data, or by setting such that the transmission is made automatically when the tablet-type terminal device 50 accesses the drawing server 20 next time.

Figure 12:
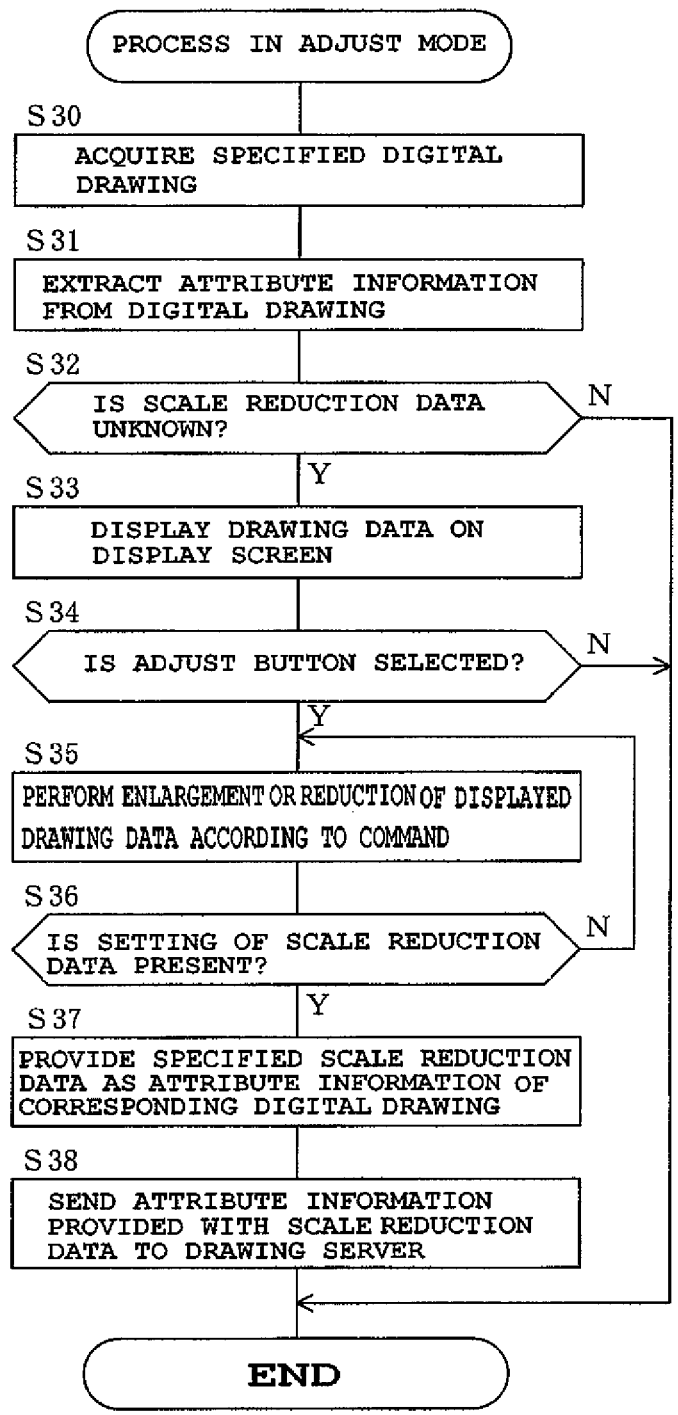
FIG. 12 is a flowchart showing processing procedure of setting the scale reduction data in the "adjust mode" according to the embodiment.

Now, a procedure of providing the scale reduction data to the digital drawing by the tablet-type terminal device 50 will be described with reference to a flowchart in FIG. 12.

First of all, upon reception of a command to specify a design drawing to be displayed on the tablet-type terminal device 50 from the user, the CPU 52 accesses the drawing server 20 via the network. At this time, the user specification information (user ID or password) is sent to the drawing server 20 as needed. Subsequently, when the user selects or input a drawing number or the like of the digital drawing requested by the user, the CPU 52 sends the drawing number or the like to the drawing server 20 and requests the digital drawing.

When the digital drawing corresponding to the drawing number or the like so specified is sent by the drawing server 20 in response to the command, the CPU 52 receives the digital drawing via the communicating device 56 (Step 30).

Subsequently, the CPU 52 extracts the attribute information from the digital drawing received in Step 30 (Step 31). At this time, if the scale reduction data is not included in the attribute information (Step 32; Y), the computation to display the drawing data at a predetermined scale reduction cannot be performed. Therefore, the CPU 52 computes the coordinate conversion value using the predetermined provisional scale reduction (for example, $\frac{1}{200}$) and the requested provisional display scale reduction (=provisional scale reduction $\frac{1}{200}$). The CPU 52 displays the drawing data (the design drawing) on the display screen 51 using this coordinate conversion value at the provisional scale reduction (Step S33).

The CPU 52 displays the "adjust" button at the lower right of the display screen 51 as shown in FIG. 10. By the display of the "adjust" button, the user can recognize that the scale reduction data is unknown.

Although not shown in FIG. 10, it is also possible to display the "provisional scale reduction $\frac{1}{200}$" as the scale reduction display at the upper left of the display screen 51.

Then, upon reception of the fact that the user has pressed the "adjust button", the CPU 52 displays the selected-scale scale reduction list at the lower right of the display screen 51, and switches the mode to the adjust mode as shown in display screen 51 in FIG. 11. In this adjust mode, the CPU 52 performs the enlargement or reduction of the displayed drawing data according to the command given by the user (Step 35).

In other words, the CPU 52 stores the scale reduction after having displayed in an enlarged or reduced scale on the display screen 51 as the requested provisional display scale reduction from the requested provisional default-display scale reduction ($\frac{1}{200}$). When a command to "double" the original size is issued by the enlargement or reduction operation by the user, a value $\frac{1}{100}$, which is twice the requested provisional default-display scale reduction ($\frac{1}{200}$) is stored as the requested provisional display scale reduction.

When the scale reduction data exists in the attribute information (Step 32; N), if the selection of the "adjust button" is not received from the user (Step 34; N), the CPU 52 ends the process.

Then, when the selection of the selected-scale scale reduction is received from among the selected-scale scale reductions displayed in the list at the lower right of the display screen 51 from the user (Step 36; Y), the CPU 52 performs a computation on the basis of Expression 2 described above, and obtains the scale reduction data of the corresponding drawing data. Then, the CPU 52 provides the scale reduction data to the corresponding digital drawing (Step 37).

Subsequently, the attribute information provided with the scale reduction data is sent to the drawing server 20 (Step 38), and the process in the adjust mode is ended.

The process in Step 38 may be performed after the adjust mode has ended.

In this modification, even when the scale reduction data is not present as the attribute information of the digital drawing, the scale reduction data may be provided later, so that the drawing can be displayed accurately at the scale reduction compliant to the actual dimensions thereafter.

Although the case where the scale reduction data is not present has been described in the modification described above, if the present scale reduction data is not correct, the scale reduction data can be provided correctly (corrected) in the same process.

In this case, since the scale reduction data itself is present, the "adjust" button is not displayed. Therefore, the user who acknowledged the error of the scale reduction performs an operation to change to the adjust mode in order to correct the scale reduction. When this operation is performed, the same process as in the case where the "adjust" button is selected shown in FIG. 10 is performed.

Although the embodiment and the modification have been described above mainly on a design drawing, the present invention is not limited thereto and, for example, may be applied to displaying a map or the like.

Also, the present embodiment may be applied not only to the drawing data to display a substance in a reduced scale, but also to drawing data to display a substance in actual dimensions. In comparison with the drawing on paper, it is portable and measurement of dimensions is achieved on the display screen 51 using a normal scale.

Furthermore, in this embodiment, the enlarged display of a substance is also possible. By displaying the drawing data of a fine object on the display screen 51 in an enlarged scale, the contents can be figured out in detail or can be measured accurately.

For example, by preparing a ten times scale, a twenty times scale, and the like with respect to the actual dimensions, conversion is no longer necessary by using the triangle scale having a gauge corresponding thereto. If it is a normal scale, the accurate dimensions can be known by performing a conversion.

REFERENCE NUMERALS

20 drawing server
22 CPU 50 tablet-type terminal device
51 display screen
52 CPI
68 drawing display program
69 display density storage
100 triangle scale
200 fixed scale reduction menu

The invention claimed is:

1. A terminal device configured to display drawing data of a digital drawing on a display screen, comprising:
a processor; and
a memory that stores a program,
wherein when the program is executed by the processor, the program causes the processor to function as:
a digital drawing receiving part configured to receive the digital drawing, the digital drawing being capable of including scale reduction data;
a display density data storing part configured to store data relating to a display density of the display screen;
a scale reduction data extracting part configured to extract the scale reduction data for printing the drawing data at an actual dimension, from the digital drawing received by the digital drawing receiving part;
a display part configured to perform a computation based on the display density data stored in the display density storing part and the scale reduction data extracted by the scale reduction data extracting part, and display the drawing data of the digital drawing on the display screen;
a fixed scale reduction presentation part configured to causes fixed scale reductions to be displayed in a list, the fixed scale reductions representing a plurality of levels of scale reductions that correspond to scale reductions of graduation marked on a triangle scale;
a scale reduction data applying part configured to apply provisional scale reduction data to the digital drawing as attribute information if the scale reduction data extraction part cannot extract the scale reduction data from the digital drawing received by the digital drawing receiving part,
wherein the scale reduction data applying part includes:
a provisional display part configured to display on the display part the drawing data of the digital drawing with the provisional scale reduction data;
an enlargement and reduction part that enlarges or reduces the drawing data displayed by the provisional display part to a size in which a dimension written in the drawing data and the graduation marked on the triangle scale match, based on a user operation;
a fixed scale reduction setting receiving part that receives a setting of a fixed scale reduction that corresponds to a scale reduction of the triangle scale that matches the enlarged or reduced drawing data selected from the plurality of fixed scale reductions displayed in the list by a user;
a scale reduction data computation part that computes the scale reduction data to be applied to the drawing data of the digital drawing from the provisional scale reduction used by the provisional display part to display the drawing data of the digital drawing, the fixed scale reduction for which the setting is received, and a provisional display request scale reduction that corresponds to a scale reduction after the enlargement or reduction of the drawing data with the fixed scale reduction received by the fixed scale reduction setting receiving part.

2. The terminal device according to claim 1, wherein the digital drawing receiving part is further configured to receive the digital drawing having scale reduction data that represents a scale of the digital drawing that corresponds to a printed form of the drawing data at actual scaled dimensions, the digital drawing including coordinates of features of the structural object in a vector format, the scale of the digital drawing being a scale reduction ratio of a dimension of the structural object relative to an actual dimension of the structural object, and
the display part is further configured to compute a coordinate conversion value by multiplying the display density data stored in the display density storing part and the scale reduction data extracted by the scale reduction data extracting part, and display the drawing data of the digital drawing on the display screen based on the coordinate conversion value so that the drawing data is displayed in the same dimensions as the drawing data printed at the actual scaled dimensions.

3. The terminal device according to claim 2, wherein the fixed scale reduction presenting part is further configured to present to the user fixed scale reductions of a plurality of stages, and
the processor is further configured to function as a selection receiving part configured to receive a selection of one of the plurality of fixed scale reductions presented by the fixed scale reduction presenting part, and
when the selection receiving part receives the selection of one of the fixed scale reductions, the display part displays the drawing data of the digital drawing at the selected fixed scale reduction.

4. The terminal device according to claim 3, wherein the plurality of fixed scale reductions presented to the user by the fixed scale reduction presenting part correspond to the scale reductions marked on the triangle scales.

5. The terminal device according to claim 2, wherein if the drawing data of the digital drawing received by the digital drawing receiving part is drawing data in a raster format, the drawing data of the corresponding digital drawing includes data relating to the drawing resolutions in both the vertical and horizontal directions.

6. The terminal device according, to claim 2, wherein the data relating to the density of the corresponding display screen stored by the display density data storing part is a value represented by the number of pixels/actual dimensions of a display area of the display screen of the corresponding display screen, and this value is stored with respect to both the vertical and horizontal direction of the display screen.

7. The terminal device according to claim 2, wherein the processor is further configured to function as
a scale reduction data inputting part configured to receive an input of a provisional scale reduction data if the received digital drawing does not have the scale reduction data; and
a fixed scale reduction setting receiving part configured to receive the setting of the fixed scale reduction from the user in a stage of the enlargement or reduction of the drawing data of the digital drawing displayed on the display screen; and
wherein the provisional display part is further configured to display the drawing data at the provisional scale reduction data on the display screen when the extracting part cannot extract the scale reduction data, and the scale reduction data computing part is further configured to compute scale reduction data to be provided for the drawing data of the corresponding digital drawing based on the requested display scale reduction when the setting of the fixed scale reduction is received by the fixed scale reduction setting receiving part, the fixed scale reduction whose setting is received thereby, and a provisional scale reduction displayed by the provisional display part.

8. A non-transitory computer-readable storage medium with a drawing display program stored thereon, wherein the drawing display program is executed by a computer in a terminal device configured to display drawing data of a digital drawing of a structural object on a display screen and to have a display density data storing part configured to store data relating to the display density of the display screen to cause the computer to perform:

a digital drawing receiving function configured to receive the digital drawing, the digital drawing being capable of including scale reduction data;

a scale reduction data extracting function configured to extract the scale reduction data for printing the drawing data at an actual dimension, from the digital drawing received by the digital drawing receiving function;

a display density data storing function configured to store data relating to a display density of the display screen;

a display function configured to perform a computation based on the display density data stored in the display density storing part and the scale reduction data extracted by the scale reduction data extracting function, and display the drawing data of the digital drawing on the display screen;

a fixed scale reduction presentation function configured to causes fixed scale reductions to be displayed in a list, the fixed scale reductions representing a plurality of levels of scale reductions that correspond to scale reductions of graduation marked on a triangle scale;

a scale reduction data applying function configured to apply provisional scale reduction data to the digital drawing as attribute information if the scale reduction data extraction function cannot extract the scale reduction data from the digital drawing received by the digital drawing receiving function, wherein the scale reduction data applying function includes:

a provisional display function configured to display on the display screen the drawing data of the digital drawing with the provisional scale reduction data;

an enlargement and reduction function that enlarges or reduces the drawing data displayed by the provisional display function to a size in which a dimension written in the drawing data and the graduation marked on the triangle scale match, based on a user operation;

a fixed scale reduction setting receiving function that receives a setting of a fixed scale reduction that corresponds to a scale reduction of the triangle scale that matches the enlarged or reduced drawing data selected from the plurality of fixed scale reductions displayed in the list by a user;

a scale reduction data computation function that computes the scale reduction data to be applied to the drawing data of the digital drawing from the provisional scale reduction used by the provisional display function to display the drawing data of the digital drawing, the fixed scale reduction for which the setting is received, and a provisional display request scale reduction that corresponds to a scale reduction after the enlargement or reduction of the drawing data with the fixed scale reduction received by the fixed scale reduction setting receiving function.

9. the non-transitory computer-readable storage medium according to claim 8, wherein the digital drawing receiving function is further configured to receive the digital drawing having scale reduction data when printed at actual scaled dimensions, the digital drawing including coordinates of features of the structural object in a vector format, the scale of the digital drawing being a scale reduction ratio of a dimension of the structural object relative to an actual dimension of the structural object, and the display function is further configured to compute a coordinate conversion value by multiplying the display density data stored in the display density storing part and the scale reduction data extracted by the scale reduction data extracting function, and display the drawing data of the digital drawing on the display screen based on the coordinate conversion value so that the drawing data is displayed in the same dimensions as the drawing data printed at the actual scaled dimensions.

* * * * *